Patented Nov. 8, 1932

1,887,396

UNITED STATES PATENT OFFICE

ARNOLD BRUNNER, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

AROMATIC HALOGEN-METHYL COMPOUND AND A PROCESS OF PREPARING IT

No Drawing. Application filed April 26, 1930, Serial No. 447,760, and in Germany April 7, 1928.

The present invention relates to new aromatic halogen-methyl compounds and a process of preparing them.

More particularly my invention relates to the new compounds of the general formula:

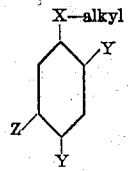

wherein X stands for oxygen or sulfur, one Y represents $CH_2$-halogen and the other Y a radical of the group consisting of $CH_2$.halogen, nitro, chlorine and alkyl, Z stands for hydrogen or, in case both of the Y's stand for $CH_2$.halogen, Z stands for halogen.

My new compounds are obtainable by treating an aromatic compound which is substituted by at least one alkoxy- or alkylthio-group and which may be further substituted with formaldehyde in the presence of a concentrated hydrogen halide solution.

According to the conditions of the reaction either one or two halogen-methyl groups can be introduced into the molecule of the aromatic compound. In general the said groups enter the para- or the ortho-position to the alkoxy or alkylthio group respectively, provided that the said positions are substituted by hydrogen. When subjecting for instance anisole to the action of formaldehyde in the presence of concentrated aqueous solution of hydrochloric acid there is obtainable in good yield a product which most probably has the following formula:

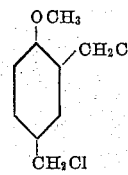

Under the same conditions of reaction hydroquinone dimethylether yields the product of the following probable formula:

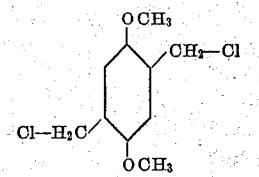

whereas para-cresol-methyl-ether yields a product of the following probable constitution:

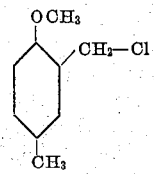

If the aromatic compound to be reacted upon is substituted by negative substituents as for instance by chlorine, the components react with each other comparatively difficultly. However even so, it is possible to introduce into the aromatic compounds in question halogen-methyl-groups. For instance from meta-chloro-anisole, a reaction product is obtainable which contains up to 2 halogen methyl groups.

In many cases I have found it preferable to provide for an excess of the hydrogen halide even in the beginning of the process. In order to secure this condition of reaction I prefer to saturate the aqueous formaldehyde solution with hydrogen halide before introducing the aromatic compound to be reacted upon. In some cases it is advantageous to add the aromatic compound only gradually. I proceed for instance in such a manner that I add at first a small quantity and add a further portion only after the first quantity has been reacted upon which fact can be seen from the change of the oily starting material into a crystallized form.

My new compounds are intended to be used as intermediate products for the manufacture of dyestuffs or as starting materials for the manufacture of artificial resins or similar products.

The following examples illustrate the invention, but they are not intended to limit it thereto, the parts being by weight:

(1) Hydrochloric acid in a gaseous form is introduced into a mixture of 250 parts of formaldehyde of 30% strength and 600 parts of concentrated hydrochloric acid until the mixture is saturated therewith. 85 parts of anisole are then added gradually, while stirring. The temperature is kept at about 30° C. and the introduction of the hydrochloric acid gas is continued. During this process which lasts for about 10 hours the anisole which has been added in a liquid form is converted into a crystalline compound. The crystals are filtered with suction, washed with a small quantity of water and dried in a current of air. The product thus obtained dissolves easily in ether and benzene. After recrystallization from warm petroleum ether, it melts at 65° C. According to the analysis and the determination of molecular weight it has the formula: $C_9H_{10}OCl_2$.

(2) Gaseous hydrochloric acid is introduced while stirring into a mixture of 34 parts of m-chloroanisole, 75 parts of a solution of formaldehyde of 30% strength and 150 parts of concentrated hydrochloric acid, while simultaneously heating on the reflux apparatus to about 80° C. After some hours the oil solidifies, on cooling, to a crystalline form. The solid product is separated from the liquid; it may be purified by distillation in a vacuum. It distils over at a temperature of 172° C.–174° C. under a pressure of 10 mm. The melting point of the distillate is at 47° C.–48° C. The analysis shows that it has the formula: $C_6H_2Cl(OCH_3)(CH_2Cl)_2$. The substance is easily soluble in ether and benzene, scarcely soluble in petroleum ether.

(3) A mixture of 61 parts of para-cresolmethylether, 100 parts of a solution of formaldehyde of 30% strength and 300 parts of concentrated hydrochloric acid is treated while stirring with gaseous hydrochloric acid until no further evolution of heat can be observed. The oily layer is separated from the aqueous part and is washed with a dilute solution of sodium carbonate and dried by means of calcium chloride. The compound thus obtained distils over at a temperature of 118° C.–120° C. under a pressure of 15 mm.; it melts at 9° C.; according to the analysis it has the formula $C_9H_{11}OCl$.

(4) A suspension of 69 parts of finely powdered hydro-quinonedimethylether in 150 parts of a solution of formaldehyde of 30% strength and 200 parts of concentrated hydrochloric acid is treated while stirring with hydrochloric acid gas as in Example 3. This operation finished, the product is filtered by suction, washed with water and dried in a current of air. It is scarcely soluble in ether; it recrystallizes from warm petroleum ether or benzene. It melts at about 165° C. The analysis and the determination of the molecular weight show that it has the formula: $C_{10}H_{12}O_2Cl_2$.

(5) Gaseous hydrochloric acid is introduced while stirring into a mixture of 1000 parts of a solution of formaldehyde of 30% strength and 3000 parts of concentrated hydrochloric acid which has been heated on the reflux apparatus to 90° C.–95° C. 690 parts of o-nitroanisole are then run into the mixture within 8–10 hours, while stirring. The introduction of the gaseous hydrochloric acid is continued for a short time at the above temperature, until the oil of a test portion taken from the mixture completely crystallizes on cooling. After cooling, the brilliant yellowish needles which have been formed are filtered by suction and dried at a moderately raised temperature. The compound, which corresponds with the formula: $C_6H_3(OCH_3)(NO_2)(CH_2Cl)$, is scarcely soluble in petroleum ether, rather difficultly soluble in ether and easily soluble in benzene and hot alcohol. After recrystallization from alcohol or a mixture of benzene and petroleum ether it melts at 87° C. Its boiling point is at about 175° C. under 5 mm. pressure.

(6) Gaseous hydrochloric acid is introduced, while stirring, into a suspension of 54.2 parts of para-thiocresolmethylether in a mixture of 50 parts of formaldehyde (30% strength) and 200 parts of concentrated hydrochloric acid, until no further heat of reaction can be observed. The oil is separated and distilled in a vacuum. The condensation product thus obtained boils at 132° C.–134° C. under a pressure of 6 mm. The distillate solidifies and has a melting point of 31° C. The compound has the formula: $C_6H_3(CH_3)(SCH_3)(CH_2Cl)$.

(7) Gaseous hydrogen chloride is introduced, while stirring, at 60° C. into a mixture of 60 parts of formaldehyde of 30% strength and 200 parts of concentrated hydrochloric acid until the mixture is saturated therewith. While the introduction of the hydrogen chloride is continued, 24.8 parts of thiophenolmethylether are added within about 2 hours, while stirring; the temperature of 60° C. is maintained for further 6 hours. After cooling, the oil solidifies to a crystalline magma. The product is filtered with suction and purified by recrystallization from hexahydrobenzene. The product, a 1-methylthio-2.4-di-(chlormethyl)-benzene, melts at 46° C. It is easily soluble in ether, benzene, difficultly soluble in cold hexahydrobenzene and petroleum ether.

I claim:

1. As new products, the compounds of the following probable formula:

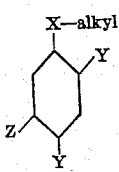

wherein X stands for oxygen or sulfur, one Y represents CH$_2$-halogen and the other Y a radical of the group consisting of CH$_2$.halogen, nitro, chlorine and alkyl, Z stands for hydrogen or, in case both of the Y's stand for CH$_2$.halogen, Z stands for halogen.

2. As new products, the compounds of the following probable formula:

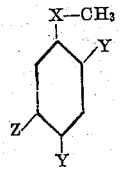

wherein X stands for oxygen or sulfur, one Y stands for CH$_2$Cl, the other Y for a residue of the group consisting of CH$_2$Cl, nitrochlorine and methyl, Z stands for hydrogen or, in case both of the Y's stand for CH$_2$Cl, Z stands for chlorine.

3. As new products, the compounds of the following probable formula:

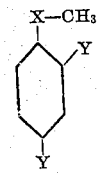

wherein X stands for oxygen or sulfur, one Y stands for CH$_2$Cl, the other Y for a residue of the group consisting of CH$_2$Cl, nitro and methyl.

4. As a new product, the compound of the following probable formula:

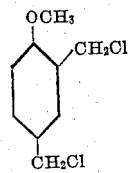

forming crystals easily soluble in ether and benzene and melting, after recrystallization from warm petroleum ether, at 65° C.

5. As a new product, the compound of the following probable formula:

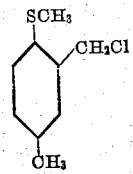

melting at 31° C. and boiling at 132° C.–134° C. under a pressure of 6 mm.

In testimony whereof, I affix my signature.

ARNOLD BRUNNER.